(12) United States Patent
Miyake et al.

(10) Patent No.: US 12,060,069 B2
(45) Date of Patent: Aug. 13, 2024

(54) MANAGER, CONTROL METHOD, STORAGE MEDIUM, VEHICLE PROVIDED WITH MANAGER, AND CONTROL APPARATUS

(71) Applicants: TOYOTA JIDOSHA KABUSHIKI KAISHA, Toyota (JP); ADVICS CO., LTD., Kariya (JP)

(72) Inventors: Kazuki Miyake, Okazaki (JP); Akitsugu Sakai, Toyota (JP); Nobuhiro Tazawa, Okazaki (JP); Shota Higashi, Tokyo (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 312 days.

(21) Appl. No.: 17/674,026

(22) Filed: Feb. 17, 2022

(65) Prior Publication Data
US 2022/0274616 A1 Sep. 1, 2022

(30) Foreign Application Priority Data
Mar. 1, 2021 (JP) ................................ 2021-031448

(51) Int. Cl.
| | |
|---|---|
| B60W 50/10 | (2012.01) |
| B60W 30/06 | (2006.01) |
| B60W 30/08 | (2012.01) |
| B60W 30/12 | (2020.01) |
| B60W 30/14 | (2006.01) |
| B60W 40/09 | (2012.01) |
| B60W 40/10 | (2012.01) |
| B60W 50/00 | (2006.01) |
| B60W 60/00 | (2020.01) |

(52) U.S. Cl.
CPC ............ *B60W 50/10* (2013.01); *B60W 40/09* (2013.01); *B60W 40/10* (2013.01)

(58) Field of Classification Search
None
See application file for complete search history.

(56) References Cited

U.S. PATENT DOCUMENTS

| | | | | |
|---|---|---|---|---|
| 8,392,764 B2* | 3/2013 | de Buen | ................. | H04L 41/12 |
| | | | | 714/758 |
| 9,855,932 B2* | 1/2018 | Kato | ....................... | B60T 13/74 |

(Continued)

FOREIGN PATENT DOCUMENTS

JP   2020-032894 A   3/2020

OTHER PUBLICATIONS

U.S. Appl. No. 17/591,112, filed Feb. 2, 2022 in the name of Nobuyuki Itoh et al.

(Continued)

*Primary Examiner* — Jaime Figueroa
*Assistant Examiner* — Atticus A Cameron
(74) *Attorney, Agent, or Firm* — Oliff PLC

(57) ABSTRACT

A manager includes an accepting unit that accepts a plurality of application IDs and a plurality of kinematic plans from a plurality of advanced driver assistance system (ADAS) applications; an arbitration unit that arbitrates the kinematic plans; and an output unit that outputs a motion request to an actuator system based on an arbitration result by the arbitration unit, the output unit outputting the motion request to the actuator system corresponding to the application ID.

3 Claims, 3 Drawing Sheets

(56) References Cited

U.S. PATENT DOCUMENTS

| | | | |
|---|---|---|---|
| 10,782,955 B2* | 9/2020 | Madrid | G06F 21/575 |
| 11,347,892 B2* | 5/2022 | Shadrin | G06F 21/629 |
| 2013/0080402 A1* | 3/2013 | Bate | B60W 50/0098 |
| | | | 707/690 |
| 2018/0375881 A1* | 12/2018 | Wada | H04W 4/48 |
| 2020/0070849 A1* | 3/2020 | Suzuki | B60W 10/20 |
| 2022/0266819 A1 | 8/2022 | Itoh et al. | |
| 2022/0274587 A1 | 9/2022 | Ohashi et al. | |

OTHER PUBLICATIONS

U.S. Appl. No. 17/590,967, filed Feb. 2, 2022 in the name of Hideki Ohashi et al.
Mar. 28, 2024 Office Action issued in U.S. Appl. No. 17/591,112.
Mar. 28, 2024 Office Action issued in U.S. Appl. No. 17/590,967.

* cited by examiner

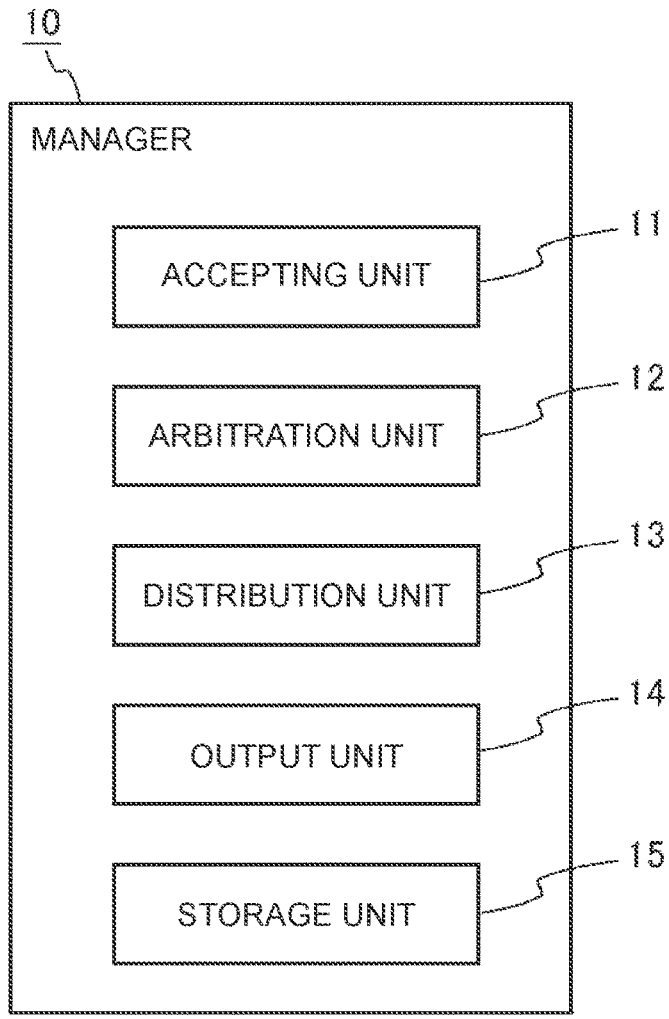

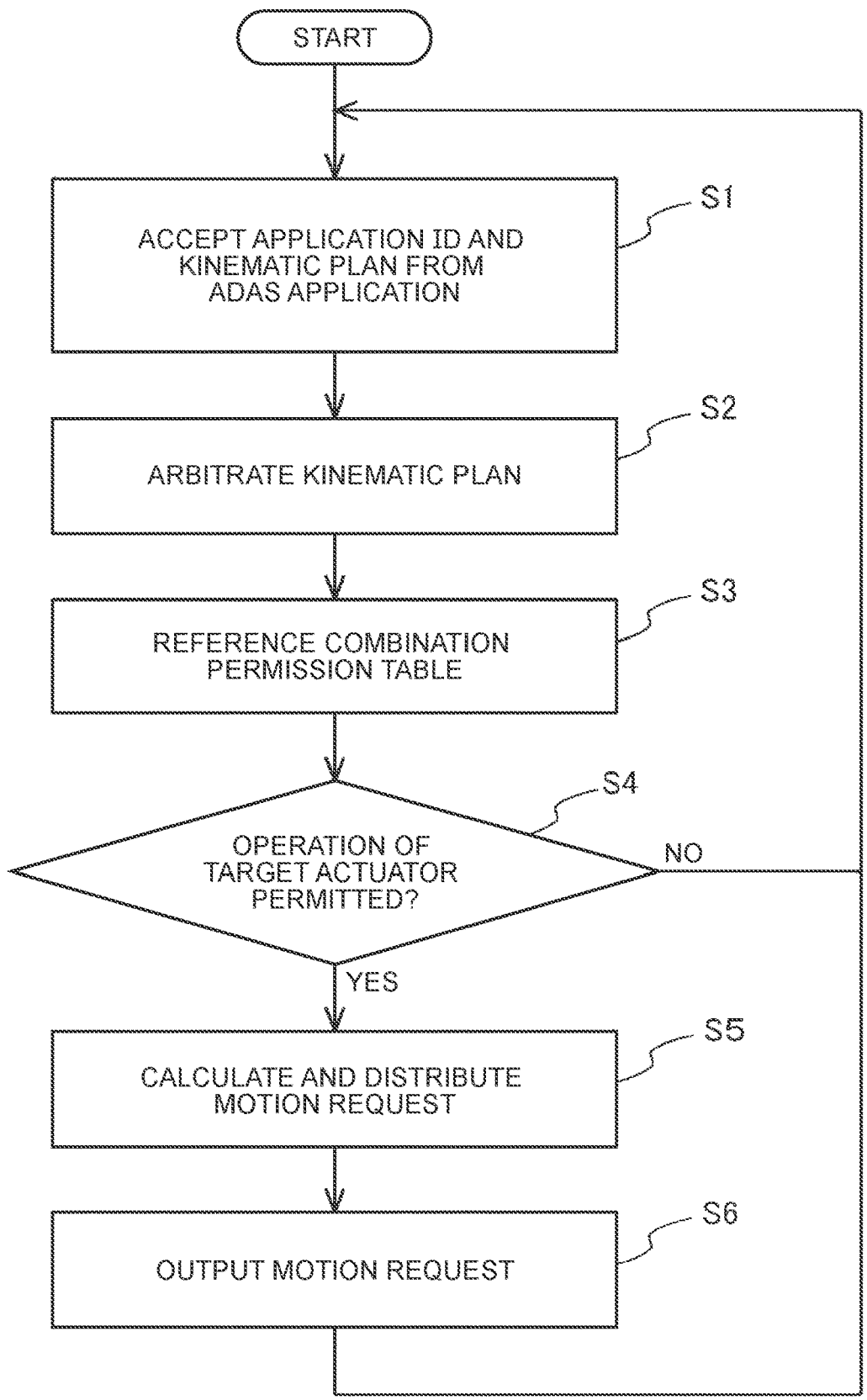

MANAGER, CONTROL METHOD, STORAGE MEDIUM, VEHICLE PROVIDED WITH MANAGER, AND CONTROL APPARATUS

CROSS-REFERENCE TO RELATED APPLICATION

This application claims priority to Japanese Patent Application No. 2021-031448 filed on Mar. 1, 2021, incorporated herein by reference in its entirety.

BACKGROUND

1. Technical Field

The present disclosure relates to a manager or the like that arbitrates kinematic requests from a plurality of advanced driver assistance system (ADAS) applications, a control method, a storage medium, a vehicle provided with the manager, and a control apparatus.

2. Description of Related Art

Japanese Unexamined Patent Application Publication No. 2020-32894 (JP 2020-32894 A) describes an information processing device that arbitrates requests output to an actuator from each of a plurality of driver assistance applications, and outputs instruction information to the actuator based on the arbitration results.

SUMMARY

Conventionally, driver assistance applications have been designed to perform operation requests for specific actuators. Conversely, as described in JP 2020-32894 A, when assuming usage of a device in which requests from a plurality of driver assistance applications are arbitrated and actuators are controlled based on the arbitration results, the driver assistance application is designed to output control targets to a manager, without identifying the actuator to operate.

However, when the driver assistance application outputs an unexpected control target, due to malfunctioning of the driver assistance application or the like, an actuator that is not appropriate for realizing the function of the driver assistance application may conceivably be operated, and the operations of the vehicle may become unstable.

Accordingly, it is an object of the present disclosure to provide a manager or the like that can suppress operation of an inappropriate actuator based on the requests of an ADAS application.

An aspect of the present disclosure relates to a manager. The manager includes: an accepting unit that accepts a plurality of application IDs and a plurality of kinematic plans from a plurality of advanced driver assistance system (ADAS) applications; an arbitration unit that arbitrates the kinematic plans; and an output unit that outputs a motion request to an actuator system based on an arbitration result by the arbitration unit, the output unit outputting the motion request to the actuator system corresponding to the application ID.

An aspect of the present disclosure relates to a vehicle. The vehicle may include the described manager.

An aspect of the present disclosure relates to a control method executed by an electronic control unit installed in a vehicle. The method includes: accepting a plurality of application IDs and a plurality of kinematic plans from a plurality of ADAS applications; performing arbitration of the kinematic plans; and outputting a motion request to an actuator system corresponding to the application ID based on an arbitration result in the arbitration.

An aspect of the present disclosure relates to a storage medium being a computer-readable non-transitory storage medium storing a program. When executed by a computer installed in a vehicle, the program causes the computer to: accepting a plurality of application IDs and a plurality of kinematic plans from a plurality of ADAS applications; performing arbitration of the kinematic plans; outputting a motion request to an actuator system corresponding to the application ID based on an arbitration result in the arbitration.

An aspect of the present disclosure relates to a control apparatus being installed in a vehicle. The control apparatus includes one or more processors. The one or more processors are configured to: accept a plurality of application IDs and a plurality of kinematic plans from a plurality of advanced driver assistance system applications; perform arbitration of the kinematic plans; and output, based on an arbitration result of the arbitration, a motion request to an actuator system corresponding to the application ID.

The present disclosure can provide a manager or the like that can suppress operation of an inappropriate actuator based on the requests of an ADAS application.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a functional block diagram of a manager according to the embodiment;

FIG. 3 is a diagram showing an example of a combination permission table stored in a storage unit; and FIG. 4 is a flowchart showing an example of control processing executed by the manager according to the embodiment.

DETAILED DESCRIPTION OF EMBODIMENTS

Figure 1:
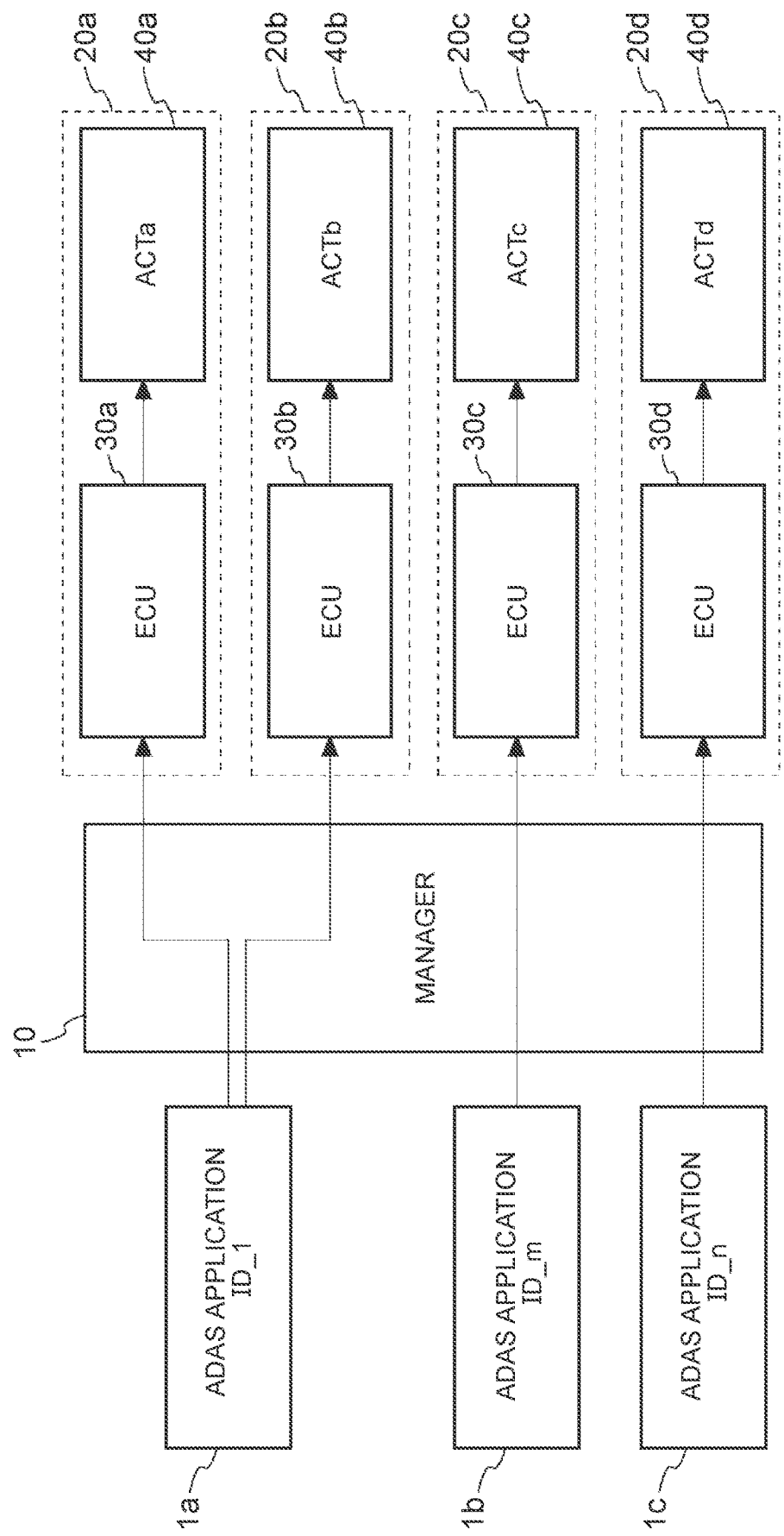
FIG. 1 is a block diagram of a vehicle control system according to an embodiment.

FIG. 1 is a block diagram of a vehicle control system according to an embodiment.

The vehicle control system of FIG. 1 includes a plurality of ADAS applications 1a to 1c, a manager 10, and a plurality of actuator systems 20a to 20d.

The ADAS applications 1a to 1c are software realizing driver assistance functions for a vehicle, such as automatic driving, automatic parking, adaptive cruise control, lane keeping assistance, collision mitigation braking, and so forth. The ADAS applications 1a to 1c are executed by a computer such as an electronic control unit (ECU) having a processor such as a central processing unit (CPU), memory, and a storage device. The ADAS applications 1a to 1c may be executed on one ECU, or may be distributed and executed by two or more ECUs. In FIG. 1, three ADAS applications 1a to 1c are illustrated for the sake of brevity of description, but the number of ADAS applications to be executed is not limited, and may be two or less, or four or more.

The ADAS applications 1a to 1c generate kinematic plans, which are control target of the vehicle, based on output values of various types of sensors installed in the vehicle, and on driver input. The ADAS applications 1a to 1c output the generated kinematic plan and application IDs, which are their own identification information, to the manager 10.

The manager 10 arbitrates the kinematic plans accepted from the ADAS applications 1a to 1c, and outputs motion request to the actuator systems 20a to 20d based on the arbitration results. Details of the manager 10 will be described later.

The actuator systems 20a to 20d are systems that realize motion requests from the manager 10. The actuator systems 20a to 20d include ECUs 30a to 30d and actuators (ACT) 40a to 40d, respectively. The ECUs 30a to 30d control the respective corresponding actuators 40a to 40d.

FIG. 2 is a functional block diagram of a manager according to the embodiment.

The manager 10 includes an accepting unit 11, an arbitration unit 12, a distribution unit 13, an output unit 14, and a storage unit 15. The manager 10 may be realized as an electronic control unit including a processor (CPU) and memory or other storage devices.

The accepting unit 11 accepts kinematic plans and application IDs from the ADAS applications 1a to 1c.

The arbitration unit 12 arbitrates the kinematic plans accepted from the ADAS applications 1a to 1c. The kinematic plans can include, for example, a target value for front-rear direction motion of the vehicle, a target value for lateral direction motion of the vehicle, a shift range, an operating state of an electric parking brake (EPB), and so forth. When a correlated kinematic plan is accepted from two or more ADAS applications, the arbitration unit 12 may perform arbitration by, for example, selecting one kinematic plan out of the kinematic plans accepted, based on a rule set in advance, or setting a permissible range of control based on the accepted kinematic plans.

The distribution unit 13 calculates motion requests for the actuator systems 20a to 20d based on the arbitration results from the arbitration unit 12, and distributes the motion requests to at least one of the actuator systems 20a to 20d. The distribution unit 13 distributes the motion request, based on the kinematic plan selected in the arbitration, to one or more out of the actuator systems 20a to 20d, based on the application ID of the ADAS application that output the kinematic plan selected by the arbitration unit 12, and a later-described combination permission table stored in the storage unit 15.

The output unit 14 outputs the motion requests, calculated and distributed based on the arbitration results by the arbitration unit, to the actuator systems 20a to 20d.

The storage unit 15 stores the combination permission table, in which the application ID of each ADAS application and information relating to the actuator system corresponding to the application ID are associated with each other. The storage unit 15 may be realized as a storage device such as memory.

FIG. 3 is a diagram showing an example of a combination permission table stored in the storage unit.

The combination permission table is defined by correlating the application IDs of the ADAS applications with actuator systems that are permitted to operate in order to realize the kinematic plans from the ADAS applications.

In the example in FIG. 3, operating ACTa and ACTb is permitted with respect to kinematic plans from the ADAS application of which the application ID is ID_1, and operating actuators other than these is forbidden. In the same way, operating ACTc is permitted with respect to kinematic plans from the ADAS application of which the application ID is ID_m, and operating actuators other than ACTc is forbidden. Also, operating ACTd is permitted with respect to kinematic plans from the ADAS application of which the application ID is ID_n, and operating actuators other than ACTd is forbidden.

In the combination permission table, in addition to comprehensively defining whether operation of the entire actuator system is permissible, whether partial operation of the actuator system is permissible can be defined. For example, when an ADAS application outputs a kinematic plan that includes a shift range change, information that permits shift changes to all shift ranges may be defined in the combination permission table, or information to permit shift changes to shift ranges other than a specific shift range (e.g., P range) may be defined.

FIG. 4 is a flowchart showing an example of control processing executed by the manager according to the embodiment. The control processing shown in FIG. 4 is started at the time of starting the vehicle (at the time of ignition (IG)-ON), for example, and is repeatedly performed at a predetermined cycle while the ADAS application is being executed.

The accepting unit 11 accepts application IDs and kinematic plans from the ADAS applications 1a to 1c in step S1. Thereafter, the processing proceeds to step S2.

In step S2, the arbitration unit 12 arbitrates the kinematic plans accepted by the accepting unit 11. Thereafter, the processing proceeds to step S3.

In step S3, the distribution unit 13 references the combination permission table stored in the storage unit 15. Thereafter, the processing proceeds to step S4.

In step S4, the distribution unit 13 determines whether the actuator system requested to operate by the kinematic plan selected in step S2 is a permitted actuator, based on the referenced combination permission table. When the determination in step S4 is YES, the processing proceeds to step S5. On the other hand, when the determination in step S4 is NO, the processing proceeds to step S1 and the kinematic plan selected in step S2 is rejected.

In step S5, the distribution unit 13 calculates a motion request for the actuator system, based on the selected kinematic plan. Also, the distribution unit 13 distributes the motion request to the actuator system corresponding to the application ID of the ADAS application that output the kinematic plan selected in step S2, based on the combination permission table. For example, in the examples of FIGS. 1 and 3, when the kinematic plan from the ADAS application 1a is selected by arbitration, the motion request is distributed to ACTa and ACTb that are the actuators corresponding to the application ID_1 of the ADAS application 1a. Distributing motion requests includes calculating motion requests for one or more actuator systems (e.g., powertrain and/or brakes) to realize one target value (e.g., front-rear acceleration), and calculating motion requests for the actuator systems (e.g., shift control and EPB control) to realize different target values. Thereafter, the processing proceeds to step S6.

In step S6, the output unit 14 outputs the motion requests, which were calculated and distributed in step S5, to the actuator systems. Thereafter, the processing proceeds to step S1.

As described above, the manager 10 according to the present embodiment outputs motion requests, calculated based on arbitration results, to the actuator system corresponding to the application ID of the ADAS application that output the kinematic plan selected by arbitration. Accordingly operations of an actuator system that is not correlated with the application ID can be suppressed with respect to the kinematic plan output by the ADAS application.

Also, the storage unit 15 of the manager 10 stores the application ID and information related to one or more actuator systems corresponding thereto (combination permission table), and accordingly definition of actuators to which permission is given can be changed as appropriate, in accordance with the type of ECUs installed in the vehicle and so forth.

The functions of the manager 10 shown in the embodiment above can also be realized as a control method executed by an in-vehicle computer including a processor (CPU), memory, and a storage device, a program executed by the computer, or a computer-readable non-transitory storage medium that stores the program. Further, the functions of the manager 10 shown in the above embodiment can also be realized as a microcomputer or an ECU in which is implemented the above control method, or a microcomputer or ECU in which a program that realizes the above control method is installed in a storage device.

The present disclosure can be used as an in-vehicle control device that arbitrates requests of ADAS applications and controls a plurality of actuator systems.

What is claimed is:

1. A vehicle comprising:
  a plurality of electronic control units in each of which is implemented a different advanced driver assistance system application;
  a plurality of actuator systems configured to cause motion of the vehicle in at least one of a front-rear direction of the vehicle and a lateral direction of the vehicle; and
  a manager coupled to the plurality of electronic control units and to the plurality of actuator systems, the manager including one or more processors configured to:
  accept, from each of the plurality of electronic control units: (i) an application ID that is specific to the advanced driver assistance system application of the electronic control unit, and (ii) a kinematic plan that relates to the motion of the vehicle;
  perform arbitration of the kinematic plans that have been accepted from the electronic control units to determine a selected kinematic plan, the selected kinematic plan having an application ID corresponding to the application ID of the advanced driver assistance system application whose kinematic plan was selected by the arbitration;
  determine whether one of the plurality of actuator systems referenced by the selected kinematic plan is associated with the application ID of the selected kinematic plan;
  reject the selected kinematic plan when the one of the plurality of actuator systems referenced by the selected kinematic plan is not associated with the application ID of the selected kinematic plan; and
  accept the selected kinematic plan when the one of the plurality of actuator systems referenced by the selected kinematic plan is associated with the application ID of the selected kinematic plan and output a motion request based on the selected kinematic plan to one or more of the plurality of actuator systems;
  wherein the one or more of the actuator systems control the vehicle according to the motion request of the accepted selected kinematic plan.

2. The vehicle according to claim 1, further comprising a storage unit that stores, for each of the advanced driver assistance system applications: (1) the application ID and (2) information indicating which of the actuator systems correspond to the specific advanced driver assistance system application, in association with each other.

3. A vehicle control method of a vehicle that includes (a) a plurality of electronic control units in each of which is implemented an advanced driver assistance system application function; (b) a plurality of actuator systems configured to cause motion of the vehicle in at least one of a front-rear direction of the vehicle and a lateral direction of the vehicle; and (c) one or more processors coupled to the plurality of electronic control units and to the plurality of actuator systems, the method executed by the one or more processors and comprising:
  accepting, from each of the plurality of electronic control units: (i) an application ID that is specific to the advanced driver assistance system application of the electronic control unit, and (ii) a kinematic plan that relates to the motion of the vehicle;
  performing arbitration of the kinematic plans that have been accepted from the electronic control units to determine a selected kinematic plan, the selected kinematic plan having an application ID corresponding to the application ID of the advanced driver assistance system application whose kinematic plan was selected by the arbitration;
  determining whether one of the plurality of actuator systems referenced by the selected kinematic plan is associated with the application ID of the selected kinematic plan;
  rejecting the selected kinematic plan when the one of the plurality of actuator systems referenced by the selected kinematic plan is not associated with the application ID of the selected kinematic plan;
  accepting the selected kinematic plan when the one of the plurality of actuator systems referenced by the selected kinematic plan is associated with the application ID of the selected kinematic plan, and outputting a motion request based on the selected kinematic plan to one or more of the plurality of actuator systems; and
  the one or more of the actuator systems controlling the vehicle according to the motion request of the accepted selected kinematic plan.

* * * * *